July 30, 1946.  C. G. VOKES  2,405,102
AIR INTAKE FILTER FOR AIRCRAFT ENGINES
Filed Nov. 20, 1942   2 Sheets-Sheet 1
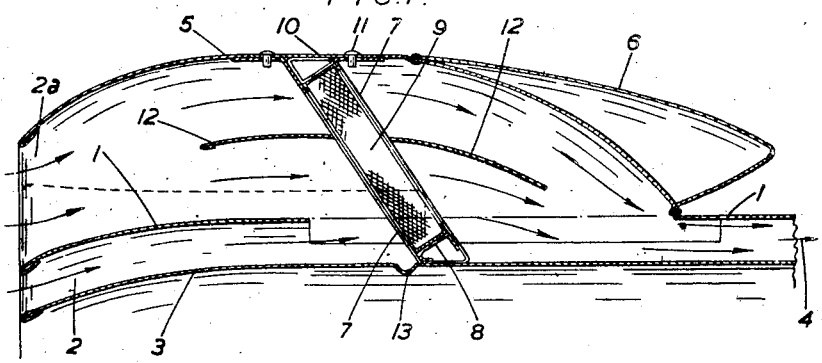
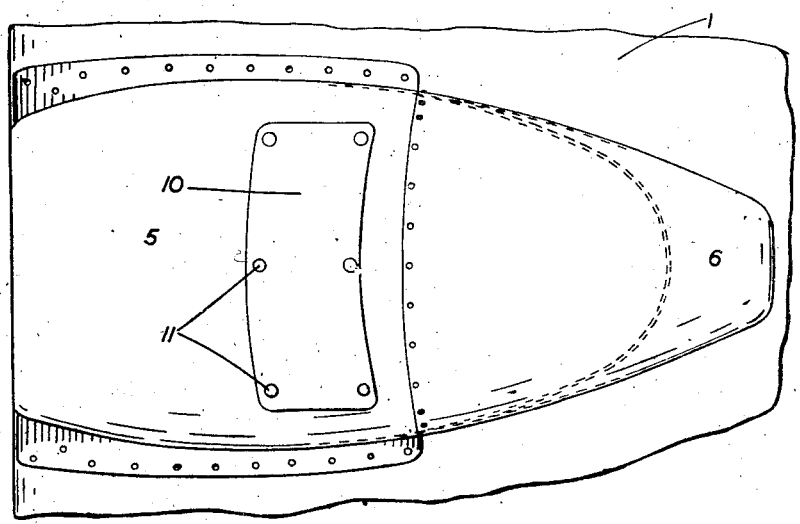
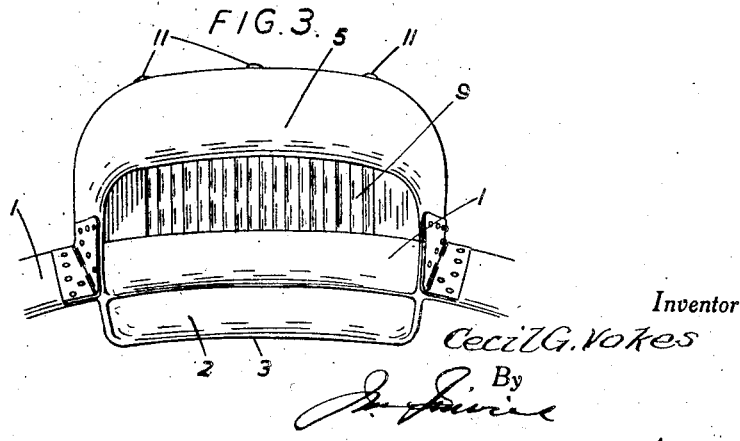
Inventor
Cecil G. Vokes
By
Attorney July 30, 1946.　　　C. G. VOKES　　　2,405,102
AIR INTAKE FILTER FOR AIRCRAFT ENGINES
Filed Nov. 20, 1942　　　2 Sheets-Sheet 2

Inventor
Cecil G. Vokes
By
Attorney

Patented July 30, 1946

2,405,102

UNITED STATES PATENT OFFICE 2,405,102

AIR INTAKE FILTER FOR AIRCRAFT ENGINES

Cecil Gordon Vokes, London, England

Application November 20, 1942, Serial No. 466,308
In Great Britain November 17, 1941

4 Claims. (Cl. 123—119)

Air intakes for aircraft engines are sometimes arranged by means of what may be regarded as a forwardly facing scoop or slot at the edge and perhaps just inside or just outside an engine cowling or exhaust collector ring. A conduit then runs back sometimes inside the cowling against the inside of its wall, and delivers at a convenient position to the engine carburettor or supercharger or other air intake.

Air intakes are also sometimes fitted just beneath the leading edge of the wing, both for an adjacent engine intake and for cooling air for an exhaust driven turbo blower, and cooling air intakes are also fitted on the engine nacelle for other purposes.

The present invention is intended to enable aircraft already fitted with such arrangements to be readily fitted with air intake filters, as well as to give a convenient arrangement for fitting intake filters generally to the engine cowling or exhaust collector ring or other suitable part of appropriate aircraft.

In a typical arrangement according to the invention an exterior bulge of streamlined form is fitted and has a forwardly facing mouth or slot which may be external and immediately opposite to an existing or normal internal one, which will for convenience be assumed to be at the top of the cowling ring. Part (or possibly the whole) of what would normally be the wall of the ring is removed or absent inside the bulge, so that at least the back portion of the latter communicates with the internal intake air conduit. An inclined filter panel (preferably of the deeply pleated type) is then arranged to lie at an incline from near the top front of the bulge, passing through the plane of the normal wall of the ring and running down to the bottom of the conduit. The interior air space at the back of the bulge is rounded off so that the filtered air from the bulge will rejoin the conduit without excessive turbulence and it will be seen that the whole of the air entering bulge and conduit can be caused to pass through the filter. The latter can be slid into position like a drawer from the top of the bulge to facilitate removal for cleaning or replacement; it might in some cases be tiltable as a whole so that unfiltered air can be used when desired. It will be noted that vibration and gravity will tend to prevent adherence of dust to the filter surface and a small exit for dust at the bottom edge of the filter can be arranged for if desired; in some cases the inclined filter panel could be kept wholly or substantially wholly within the bulge and a flap used to permit admission of filtered or unfiltered air at will, or to control admission of external air or warm air from inside a cowling or nacelle in desired proportions.

It will be apparent that somewhat similar arrangements can be used where engine intake or cooling air is taken in at other positions as mentioned above. Wherever excessive turbulence is caused by the inclination of the filter or inability to provide a straight course for the air, air straightening means in the form of a number of cells or partitions may be found desirable behind the filter and in some cases in the path of the air to the filter.

The above should suffice to make the nature of the invention generally clear. Other parts of the invention are embodied in typical examples which are illustrated by the accompanying drawings, the parts for which a monopoly is desired being those set out in the claims.

In the drawings—

Fig. 1 is a sectional view showing an example in which a bulge with an additional air intake has been added behind and above an existing air intake.

Fig. 2 is a plan view of the added part and

Fig. 3 is a front view,

Figure 4:
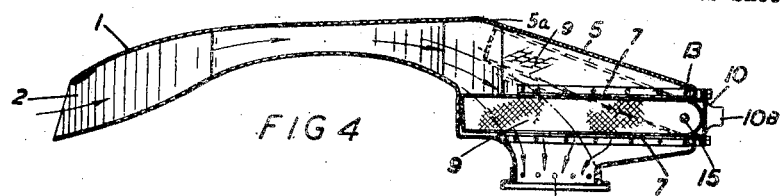
Figure 5:
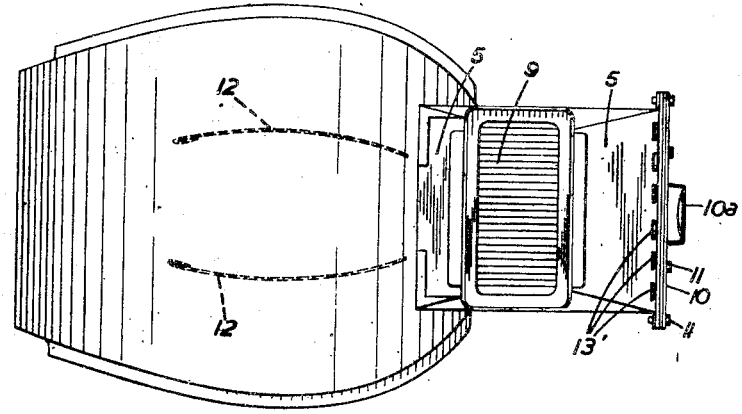
Figure 6:
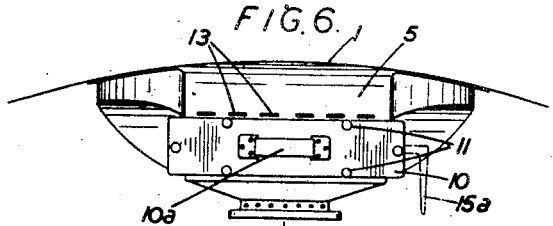
Figure 7:
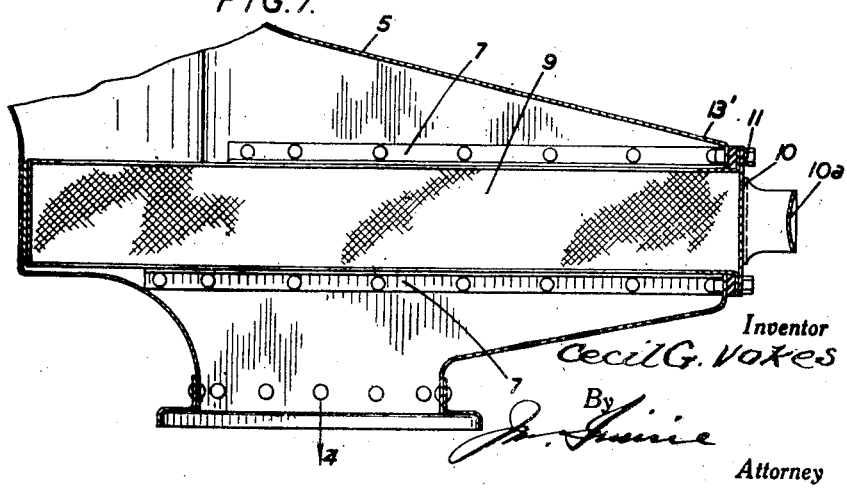

Fig. 4 is a sectional view of another example in which the bulge replaces part of a normal conduit for incoming air, Fig. 5 is a bottom view of the same, Fig. 6 is a rear view, and Fig. 7 is a view to larger scale of the back part of Fig. 4 with fixed slideways and removable filter panel, so that those skilled in aircraft construction can readily see how the schematic showing of Figs. 1 to 6 can be realised in practice.

Turning to Figs. 1 to 3, the normal skin of an engine cowling is shown at 1, as for example in the wing of an early Liberator aeroplane the chain dotted line in Fig. 1 indicating its normal form when a simple internal intake at 2 is defined by the wall of the conduit 3, this conduit leading the air to the engine intake as indicated by the arrow 4. According to this example of the present invention a bulge 5 is disposed outside the skin 1, giving an additional air intake at 2a. A stream-lined fairing 6 is added at the back. Slideways 7 with a bottom piece 8 define a partition across the whole area with an opening into which the filter panel 9 can be slid from the top. It is attached to the cover plate 10 which can be secured by fasteners 11 of standard type. Air flow directing plates 12 can be inserted if desired. It will be observed that in this case the effective air intake area has been substantially increased in front of the filter. A channel at 13 will allow for escape of rain or dust deflected or shaken from the filter surface, which is preferably of the deeply pleated type. There are slotted apertures at 13 and high velocity through them when the aircraft is traveling at speed or the propeller running. Heavier particles tend to keep to a straight course as the air turns down and will be sucked out with the high velocity air in the chamber 13.

Turning now to Figs. 4 to 7, the normal skin 1 of the engine cowling and the duct 3 would normally follow the chain dotted lines. The bulge 5 in this case lies within the normal profile as viewed from the front of the aircraft, as may be seen from the rear view, Fig. 6. Slideways 7 and the filter panel 8, cover 10 and fasteners 11 are all indicated, the panel being withdrawable by a handle 10a to the rear. If it is desired to be able to obtain a free opening for unfiltered air at higher altitudes or when full engine power is essential, the filter panel can be pivoted to the cover plate and sides of the slide at 15 and withdrawn with it, the pivot pin engaging by a coupling, as it is inserted, with an external lever 15a. Then if the bulge be carried up a little further as indicated at 5a the filter panel can be swung up out of the path of the incoming air. Dust and rain apertures 13' can be provided. Fig. 7 shows the filter parts with fixed guides 7 to enlarged scale, in order to indicate typical details, which will be seen to be substantially conventional.

I claim:

1. A forwardly facing engine air intake for aircraft or the like, said intake having a bulge to provide additional air intake area, the air intake wall having an opening to cause the air passing through the bulge to enter the air intake area, and a filter panel mounted for selective removal and acting when in operative position to bridge the area within the bulge and within the air intake proper to thereby filter the air passing through both such areas.

2. An engine air intake for directing external air to aircraft or the like, said intake having a bulge beyond the intake opening, a slide-way traversing the bulge, a filter panel movable in the slide-way to an operative position traversing the air intake area, a wall of the bulge being formed with an opening through which the filter panel may be withdrawn at will, and means to provide a substantially air tight closure for said bulge wall opening when the filter panel is in operative position.

3. A construction as defined in claim 2, wherein the filter panel is disposed in a slideway so arranged that the panel can be withdrawn through the plane of the skin of bulge.

4. A construction as defined in claim 2, in which the filter panel is tiltable as a whole so that unfiltered air can be used when desired.

CECIL GORDON VOKES.